United States Patent
Aiba

(10) Patent No.: US 10,339,687 B2
(45) Date of Patent: Jul. 2, 2019

(54) IMAGE PROCESSING APPARATUS, METHOD FOR CONTROLLING SAME, IMAGING APPARATUS, AND PROGRAM

(71) Applicant: CANON KABUSHIKI KAISHA, Tokyo (JP)

(72) Inventor: Toshitaka Aiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/611,488

(22) Filed: Jun. 1, 2017

(65) Prior Publication Data
US 2017/0352177 A1 Dec. 7, 2017

(30) Foreign Application Priority Data
Jun. 3, 2016 (JP) .................. 2016-112159

(51) Int. Cl.
*G06T 11/60* (2006.01)
*G06T 5/00* (2006.01)

(52) U.S. Cl.
CPC .............. *G06T 11/60* (2013.01); *G06T 5/002* (2013.01); *G06T 5/003* (2013.01); *G06T 2200/24* (2013.01)

(58) Field of Classification Search
CPC ......... G06T 11/60; G06T 5/002; G06T 5/003; G06T 2200/24
USPC ........................................... 382/309
See application file for complete search history.

(56) References Cited

U.S. PATENT DOCUMENTS

2008/0147726 A1* 6/2008 Hwang ............. G06F 17/30265
2012/0300095 A1* 11/2012 Sawada ............... H04N 5/2258
348/222.1

FOREIGN PATENT DOCUMENTS

| JP | 2012-186790 A | 9/2012 | |
| JP | 2014-228586 A | 12/2014 | |
| WO | WO-2015163068 A1 * | 10/2015 | ............... G06F 3/16 |

* cited by examiner

*Primary Examiner* — Amandeep Saini
(74) *Attorney, Agent, or Firm* — Canon U.S.A., Inc. IP Division

(57) ABSTRACT

An image processing apparatus includes a unit configured to read an image file including viewpoint images, a unit configured to determine a photographic condition, an image processing unit configured to apply image processing to image data based on the viewpoint images, and a limitation unit configured to limit a settable parameter of the image processing based on the photographic condition.

15 Claims, 6 Drawing Sheets

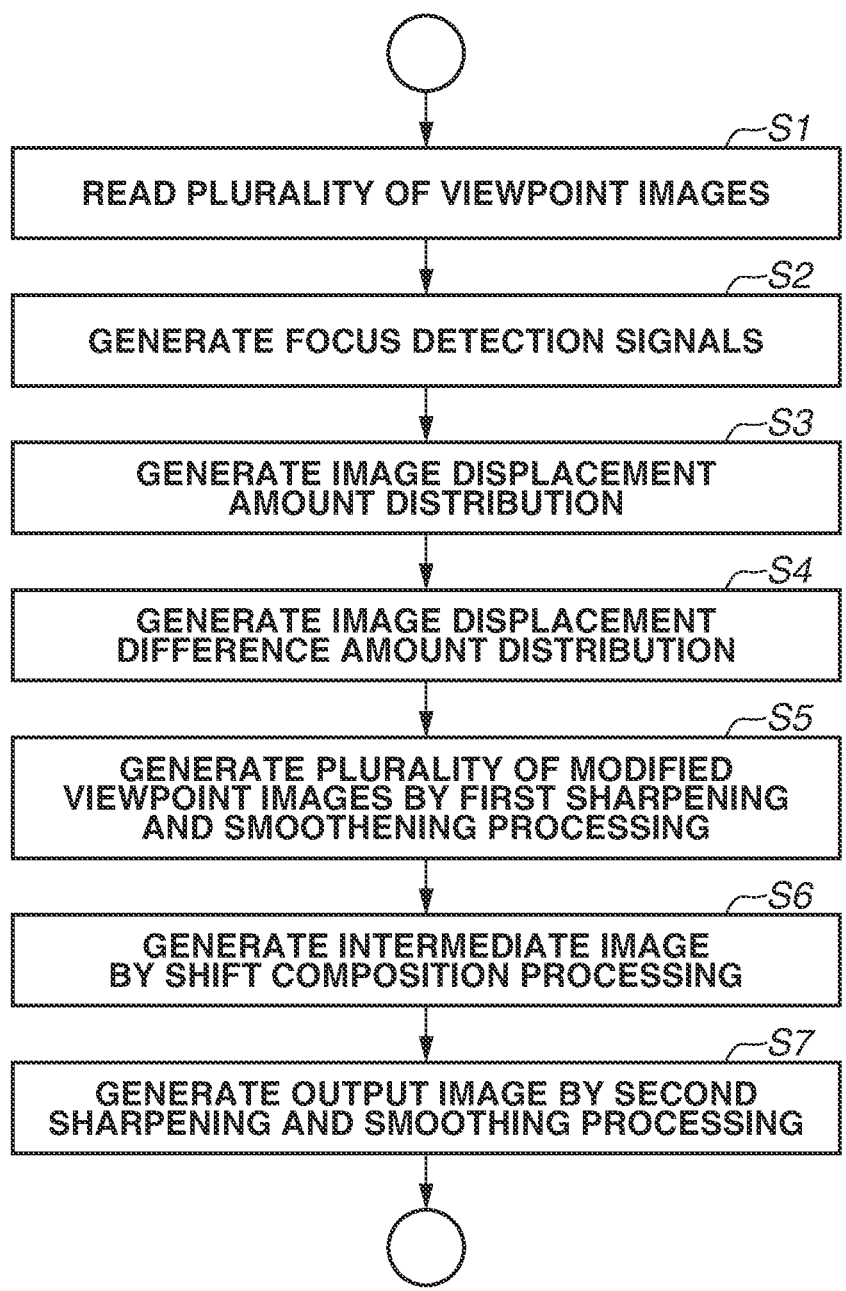

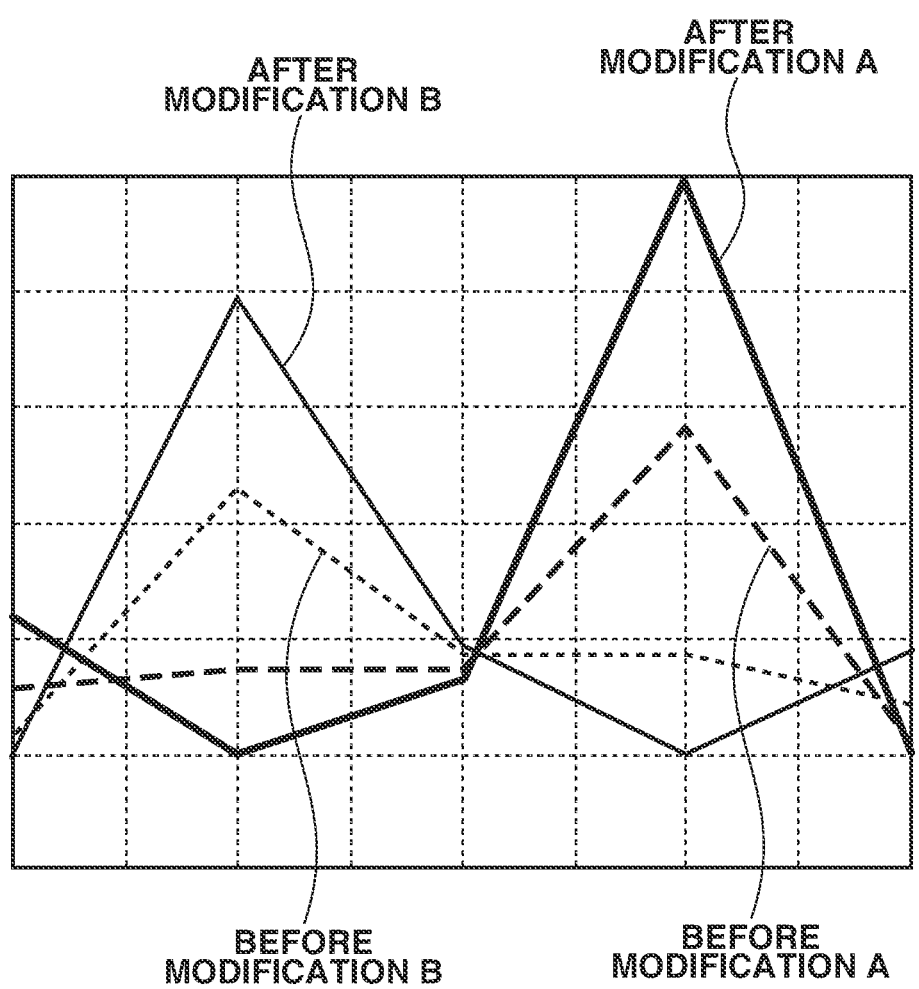

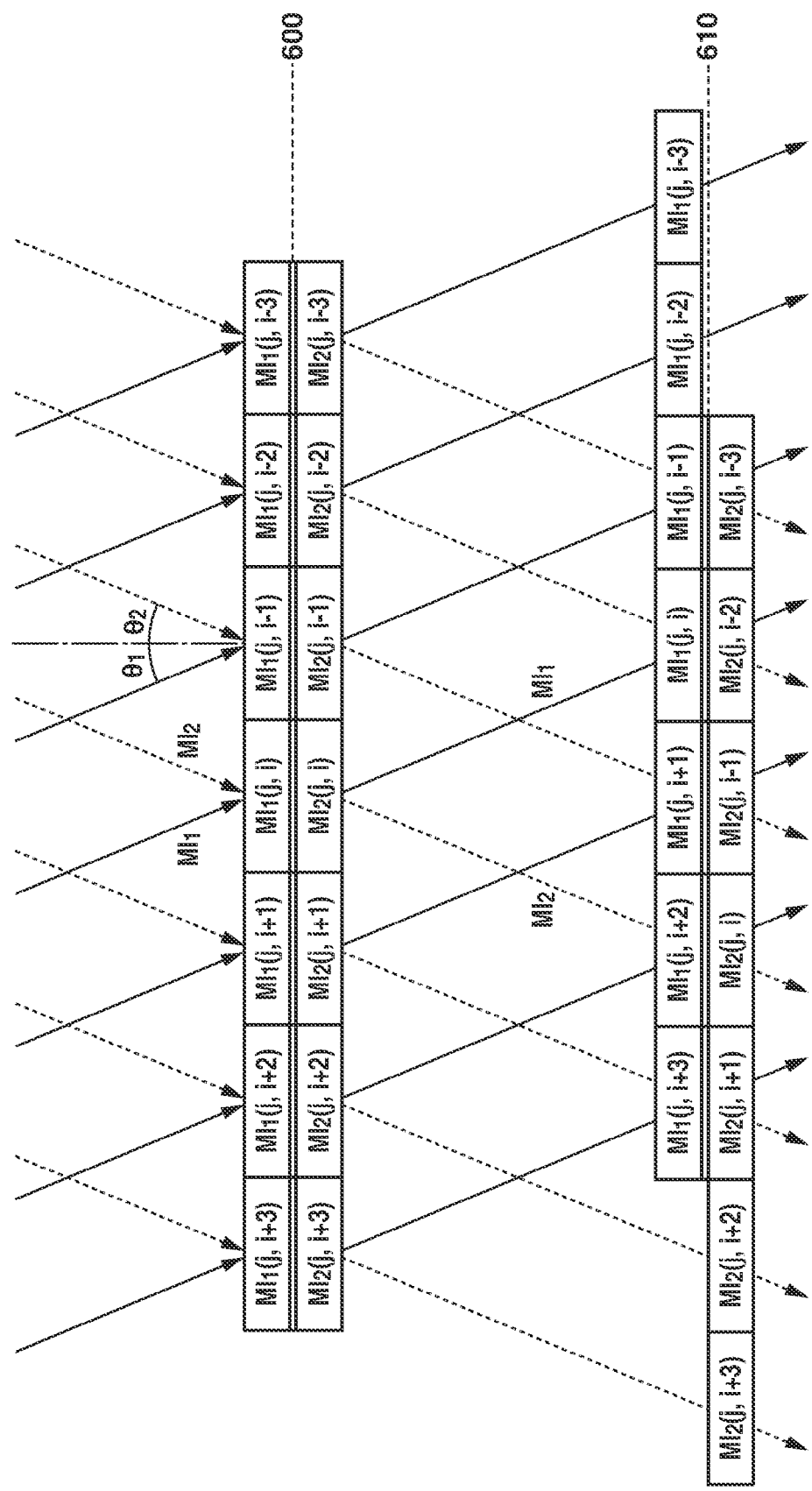

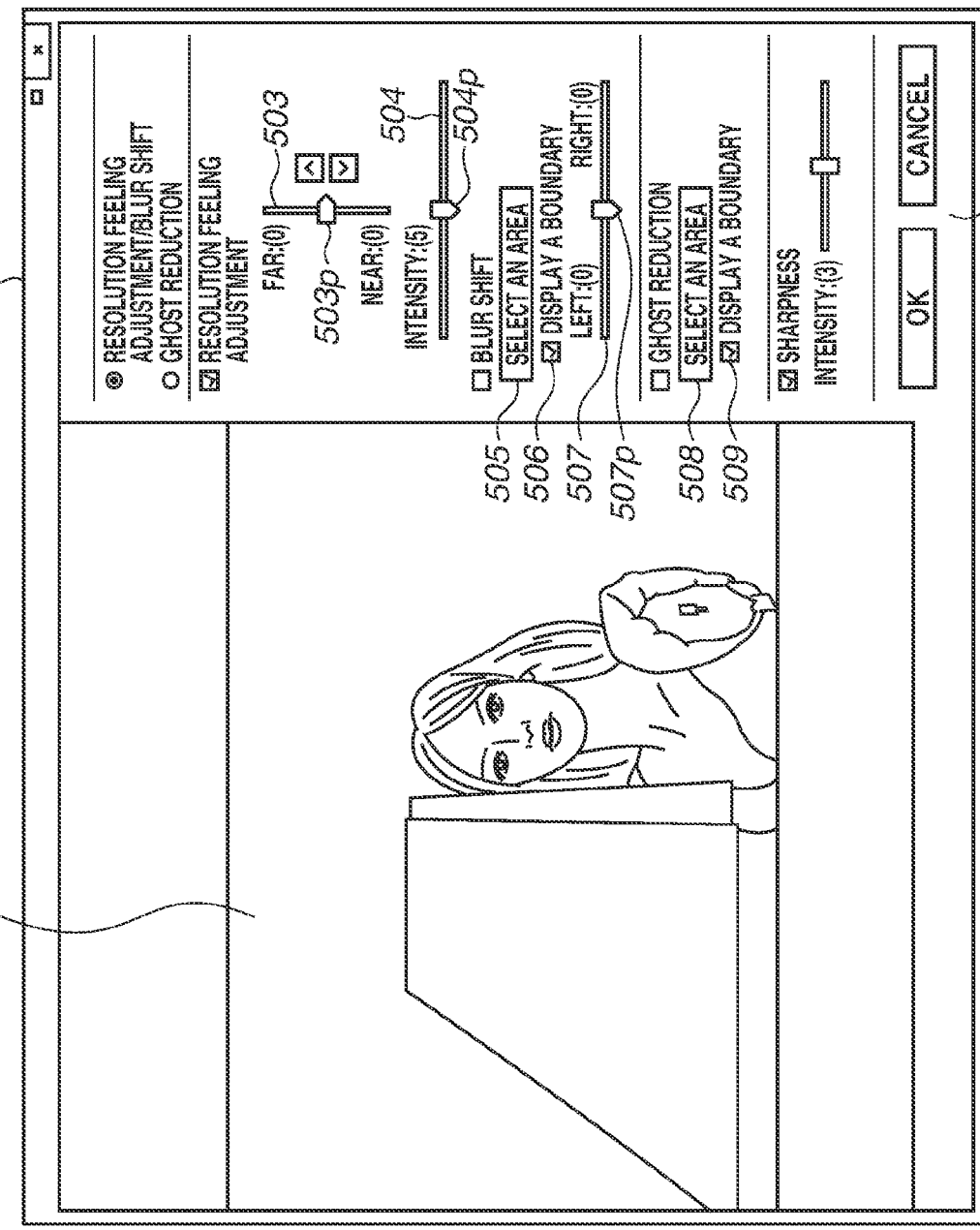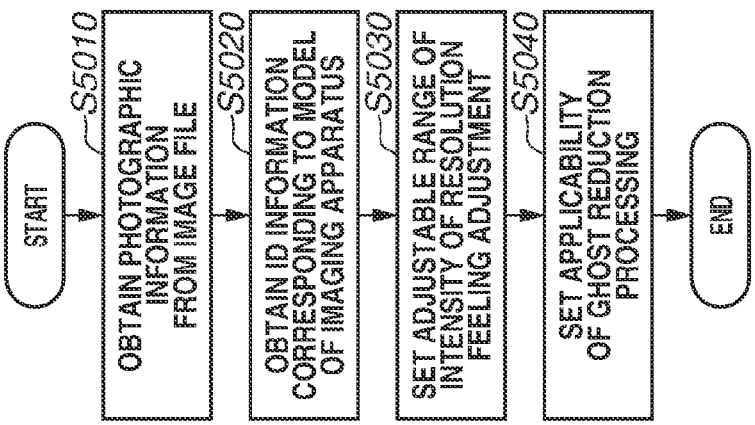

FIG.6A

| ADJUSTMENT OF RESOLUTION FEELING | | | |
|---|---|---|---|
| ISO SENSITIVITY THRESHOLD | 800 | 3200 | 12800 |
| INTENSITY (CORRECTION COEFFICIENT) | 1.0 | 0.8 | 0.6 |

FIG.6B

|  | GHOST REDUCTION |
|---|---|
| LENS A | × |
| LENS B | ○ |
| LENS C | ○ |

IMAGE PROCESSING APPARATUS, METHOD FOR CONTROLLING SAME, IMAGING APPARATUS, AND PROGRAM

BACKGROUND

Field of the Disclosure

The present disclosure relates to an image processing technique using viewpoint images.

Description of the Related Art

Several types of image processing have been discussed which use a plurality of viewpoint images including the same object image obtained by photographing. Japanese Patent Application Laid-Open No. 2012-186790 discusses a technique for generating an image from an arbitrary (virtual) point of view out of images captured at more than one point of view while adjusting a composition ratio between the images. Japanese Patent Application Laid-Open No. 2014-228586 discusses a technique for relatively shifting and compositing a plurality of parallax images to generate an image refocused on a virtual image plane. The parallax images are obtained from an image sensor in which a plurality of photoelectric conversion units is assigned to a single microlens.

When such image processing using a plurality of viewpoint images is performed in an application based on user operations, it is difficult to make a setting because a change in a parameter can cause different degrees of image effect depending on a photographic condition.

SUMMARY

The present disclosure is directed to providing an image processing apparatus for performing image processing using a plurality of viewpoint images and a method for controlling the same, wherein a desired image effect is obtained by a user's simple operations.

According to an aspect of the present disclosure, an image processing apparatus includes an acquisition unit configured to obtain a plurality of viewpoint images and imaging information corresponding to the plurality of viewpoint images, an image processing unit configured to apply image processing to image data based on the viewpoint images, a setting unit configured to set a parameter of the image processing by the image processing unit based on a user operation, and a limitation unit configured to limit a parameter set table by a user via the setting unit in the image processing based on the imaging information.

According to another aspect of the present disclosure, a method for controlling an image processing apparatus includes obtaining a plurality of viewpoint images and imaging information corresponding to the plurality of viewpoint images, imposing a limitation on a user-settable parameter in image processing by an image processing unit based on the imaging information, setting a parameter of the image processing by the image processing unit based on a user operation and the limitation, and applying the image processing by the image processing unit to image data based on the viewpoint images.

Further features of the present disclosure will become apparent from the following description of exemplary embodiments with reference to the attached drawings.

BRIEF DESCRIPTION OF THE DRAWINGS

FIG. 2 is a flowchart of processing for adjusting resolution feeling according to one or more aspects of the present disclosure.

FIG. 3 is a graph illustrating an effect of modification processing for dividing viewpoint images according to one or more aspects of the present disclosure.

FIG. 4 is a conceptual diagram for describing refocus processing according to one or more aspects of the present disclosure.

FIG. 5A is a graphical user interface (GUI) of an application according to one or more aspects of the present disclosure. FIG. 5B is a flowchart according to one or more aspects of the present disclosure.

FIGS. 6A and 6B are diagrams illustrating tables showing a correspondence between photographic conditions and image processing according to one or more aspects of the present disclosure.

DESCRIPTION OF THE EMBODIMENTS

Figure 1:
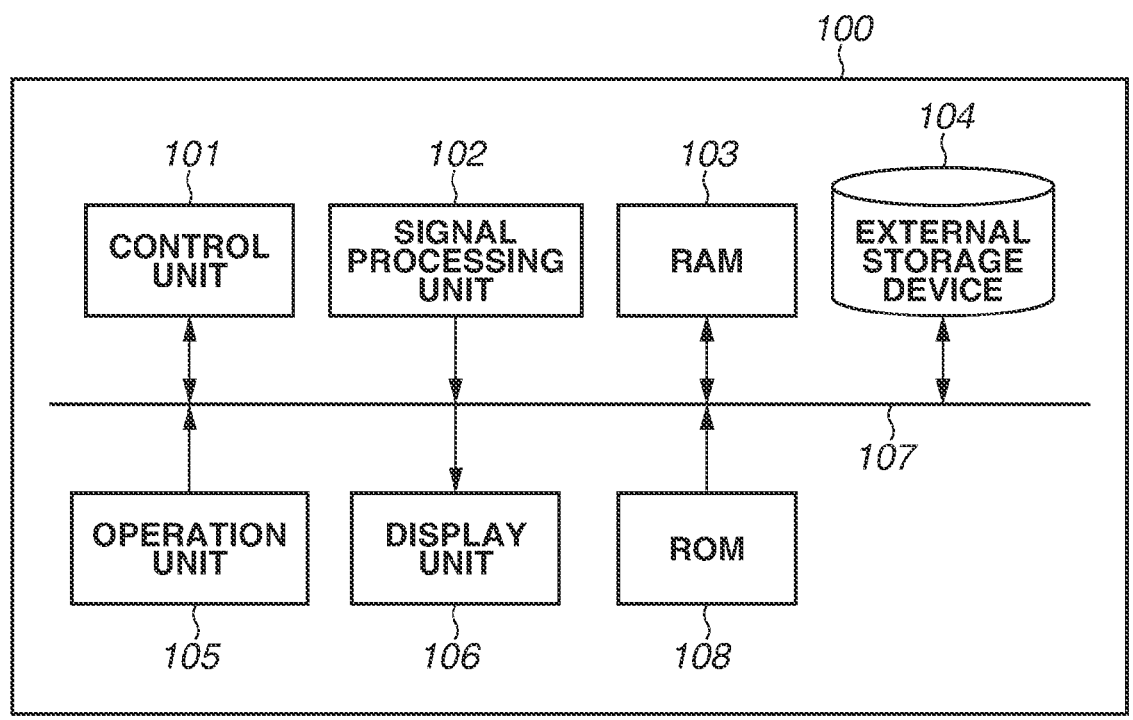
FIG. 1 is a block diagram illustrating a configuration of an image processing apparatus according to one or more aspects of the present disclosure.

An exemplary embodiment of the present disclosure will be described in detail below with reference to the drawings.

FIG. 1 is a block diagram illustrating a schematic configuration of an image processing apparatus 100 according to a first exemplary embodiment of the present disclosure. The image processing apparatus 100 includes a control unit (central processing unit (CPU)) 101, a signal processing unit 102, a random access memory (RAM) 103, an external storage device 104, an operation unit 105, a display unit 106, and a read-only memory (ROM) 108. Such components are communicably connected with each other via a bus 107.

The control unit 101 includes a CPU. The control unit 101 loads various programs stored in the ROM 108 into the RAM 103 and controls an operation of various parts of the image processing apparatus 100 to perform an overall control on the image processing apparatus 100.

The signal processing unit 102 performs general image processing and specific image processing on image data loaded into RAM 103 according to the present exemplary embodiment. The general image processing is performed on image data that is read from the external storage device 104 and loaded into the RAM 103. Examples of the general image processing are synchronization of Bayer-array image signals output from an image sensor, various types of correction processing such as shading correction, white balancing, development processing such as gamma correction and color conversion processing, encoding, decoding, and compression processing. The processing specific to the present exemplary embodiment includes processing for adjusting the resolution feeling and processing for controlling a composition ratio of a plurality of viewpoint images. The resolution feeling adjustment processing includes adjusting the position where the plurality of viewpoint images appears to be in focus, and adjusting overall resolution feeling. The processing for controlling the composition ratio of the plurality of viewpoint images is blur shift processing as well as ghost reduction processing. The blur shift processing controls the composition ratio to change a point of view and shift a blur. The ghost reduction processing reduces a ghost occurring in an image. Details of the processing will be described below.

As an example of the RAM 103, a dynamic random access memory (DRAM) can be used. The RAM 103 includes an area for loading the programs to be executed by the control unit 101, and stores various types of arithmetic data calculated by the control unit 101. An example of the external storage device 104 is a nonvolatile memory such as a flash memory. The external storage device 104 stores image data and various parameters needed for the operation of the control unit 101. The ROM 108 stores various programs such as a control program and an application program to be executed by the control unit 101.

The operation unit 105 includes input devices such as a mouse, a keyboard, and a touch panel. The operation unit 105 instructs the control unit 101 to execute processing desired by a user according to a user's operation. An example of the display unit 106 is a liquid crystal display (LCD). The display unit 106 displays image data and a graphical user interface (GUI). A display control of the display unit 106 is performed by the control unit 101. The bus 107 includes an address bus, a data bus, and a control bus. The bus 107 enables communications between the components.

The viewpoint images to be read from, the external storage device 104 and processed in the present exemplary embodiment are captured by using a two-dimensional image sensor in which one microlens and segmented photoelectric conversion elements (photoelectric conversion units) are provided for each pixel. The plurality of the segmented photoelectric conversion elements is configured to receive light in different areas of an exit pupil of an imaging lens via the one microlens to make a pupil division. Image signals of the viewpoint images of which light is received by the plurality of split photoelectric conversion units can be added to generate a normal imaging signal corresponding to the entire exit pupil of the imaging lens. The image signals of the plurality of viewpoint images with respect to the captured image are equivalent to light field data. The light field data is information with respect to a spatial distribution and an angle distribution of light intensity. That is, the method for obtaining the plurality of viewpoint images is not limited thereto. A multi-lens imaging apparatus may be used to obtain a plurality of viewpoint images. An identical single-lens image sensor may be used to capture the viewpoint images from plural points of view a plurality of times in a time series manner.

Next, the processing for adjusting resolution feeling will be described. The processing is specific to the present exemplary embodiment and performed by the signal processing unit 102. The processing for adjusting the resolution feeling includes refocus processing and sharpness/unsharpness processing. In the refocus processing, viewpoint images are relatively shifted and synthesized to correct a focus position. The sharpness/unsharpness processing applies sharpness or unsharpness based on a parallax (image displacement amount) between the viewpoint images.

FIG. 2 illustrates a flowchart of the resolution feeling adjustment processing. The resolution feeling adjustment processing is performed by the control unit 101 or by various components according to instructions from the control unit 101.

In step S1, the control unit 101 reads a plurality of viewpoint images stored in the external storage device 104.

[Image Displacement Amount Distribution]

In the present exemplary embodiment, a distribution of image displacement amounts between the viewpoint images is calculated to perform more effective refocus processing and determine an area to apply sharpness/unsharpness to.

In step S2, the control unit 101 performs one-dimensional band-pass filter processing on a first viewpoint luminance signal Y1 in a pupil division direction (column direction) to generate a first focus detection signal dYA. The first viewpoint luminance signal Y1 is generated from a first viewpoint image $I_1$ which is Bayer-array red, green, and blue (RGB) signals. The control unit 101 also performs the one-dimensional band-pass filter processing on a second viewpoint luminance signal Y2 in a parallactic direction (pupil division direction, column direction) to generate a second focus detection signal dYB. The second viewpoint luminance signal Y2 is generated from a second viewpoint signal $I_2$. For example, a first-order differential filter [1, 5, 8, 8, 8, 8, 5, 1, −1, −5, −8, −8, −8, −8, −5, −1] may be used as a one-dimensional band-pass filter. The control unit 101 may adjust the pass band of the one-dimensional band-pass filter if needed.

In step S3, the control unit 101 relatively shifts the first and second focus detection signals dYA and dYB in the parallactic direction (column direction) and calculates a correlation amount indicating a degree of coincidence of the first and second focus detection signals dYA and dYB. Suppose, for example, a predetermined value is 0.2. The control unit 101 generates an image displacement amount distribution $M_{DIS}(j, i)$ based on the correlation amount. Detection of the image displacement amount may be limited to a high contrast area where there is no perspective competition or occlusion, so that the detection accuracy of the image displacement amount becomes high and the processing is accelerated.

A first focus detection signal dYA that is the $j_2$-th ($-n_2 \leq j_2 \leq n_2$) in a row direction and the $i_2$-th ($-m_2 \leq i_2 \leq m_2$) in the pupil division direction, or column direction, with a position (j, i) at the center will be denoted by dYA (j+$j_2$, i+$i_2$). A second focus detection signal dYB that is the $j_2$-th in the row direction and the $i_2$-th in the column direction will be denoted by dYB (j+$j_2$, i+$i_2$). A shift amount will be denoted by s ($-n_s \leq s \leq n_s$). The control unit 101 then calculates a correlation amount $COR_{EVEN}(j, i, s)$ and a correlation amount $COR_{ODD}(j, i, s)$ in each position (j, i) by Eqs. (1A) and (1B), respectively:

$$COR_{EVEN}(j, i, s) = \sum_{j_2=-n_2}^{n_2} \sum_{i_2=-m_2}^{m_2} |dYA(j+j_2, i+i_2+s) - dYB(j+j_2, i+i_2-s)| \quad (1A)$$

$$COR_{ODD}(j, i, s) = \sum_{j_2=-n_2}^{n_2} \sum_{i_2=-m_2}^{m_2} |dYA(j+j_2, i+i_2+s) - dYB(j+j_2, i+i_2-1-s)| \quad (1B)$$

The correlation amount $COR_{ODD}(j, i, s)$ is an amount obtained by changing the shift amount between the first and second focus detection signals dYA and dYB by a half phase of −1 with respect to the $COR_{EVEN}(j, i, s)$.

The control unit 101 calculates real-valued shift amounts s at which the respective correlation amounts $COR_{EVEN}(j, i, s)$ and $COR_{ODD}(j, i, s)$ have minimum values, by sub pixel calculation. The control unit 101 calculates an average of the real-valued shift amounts s and generates an image displacement amount distribution $M_{DIS}(j, i)$.

The control unit 101 may separately detect contrast of each area, and set $M_{DIS}(j, i)=0$ in areas excluded from the calculation of the image displacement amount, like areas where there is a large difference in contrast between the two images.

As described above, in the present exemplary embodiment, the image displacement amount distribution $M_{DIS}(j, i)$ is generated from the plurality of viewpoint images.

If the resolution feeling adjustment processing is performed for the second and subsequent times, the generation of the image displacement amount distribution $M_{DIS}(j, i)$ may be omitted to reduce the processing time. Therefore, it is desirable that the generated image displacement amount distribution $M_{DIS}(j, i)$ is recorded on a recording medium of the external storage device 104 in association with the recorded image data.

The image displacement amount distribution $M_{DIS}(j, i)$ may be multiplied by a conversion coefficient corresponding to the position (j, i), an aperture value of the imaging lens (imaging optical system), and an exit pupil distance, and thereby converted into a defocus amount distribution indicating a distribution of defocus amounts of an object within the viewpoint images.

[Image Displacement Difference Amount Distribution]

In step S4 of FIG. 2, the control unit 101 generates an image displacement difference amount distribution $M_{DIFF}(j, i)$ from the image displacement amount distribution $M_{DIS}(j, i)$ and a predetermined image displacement amount.

In step S4, the control unit 101 initially sets an image displacement amount to be modified by the refocus processing of the present exemplary embodiment as a predetermined image displacement amount p.

In step S4, the control unit 101 then calculates the image displacement difference amount distribution $M_{DIFF}(j, i)$ from the image displacement amount distribution $M_{DIS}(j, i)$, the predetermined image displacement amount p, and a contrast distribution $M_{CON}(j, i)$ by Eq. (2):

$$M_{DIFF}(j, i) = \left(1 - \frac{|M_{DIS}(j, i) - p|}{\sigma_p}\right) \times M_{CON}(j, i) \quad (2)$$

where $\sigma_p > 0$.

The image displacement difference amount distribution $M_{DIFF}(j, i)$ is a distribution obtained by multiplying a monotonically decreasing linear function by an absolute value of a difference between the image displacement amount distribution $M_{DIS}(j, i)$ and the predetermined image displacement amount p, or $|M_{DIS}(j, i)-p|$, and by the contrast distribution $M_{DIFF}(j, i)$. The image displacement difference amount distribution $M_{DIFF}(j, i)$ is positive if $|M_{DIS}(j, i)-p|<\sigma_p$. The image displacement difference amount distribution $M_{DIFF}(j, i)$ is 0 if $|M_{DIS}(j, i)-p|=\sigma_p$. The image displacement difference amount distribution $M_{DIFF}(j, i)$ is negative if $|M_{DIS}(j, i)-p|>\sigma_p$.

The control unit 101 sets $M_{DIFF}(j, i)=(1-|p|/\sigma_p)\times M_{CON}(j, i)$ in areas where the contrast distribution $M_{CON}(j, i)$ has a value smaller than a predetermined value (for example, 0.2) and that are excluded from the calculation of the image displacement amount. Other values may be set if needed.

[Modified Viewpoint Images]

In step S5 of FIG. 2, the control unit 101 performs first sharpening and first smoothing processing on the first and second viewpoint images $I_1$ and $I_2$ (first to $N_{LF}$-th viewpoint images) according to the image displacement difference amount distribution $M_{DIFF}(j, i)$. The control unit 101 thereby generates a first modified viewpoint image and a second modified viewpoint image (first to $N_{LF}$-th modified viewpoint images).

In the present exemplary embodiment, in areas where the image displacement difference amount distribution $M_{DIFF}(j, i)$ is 0 or higher ($M_{DIFF}(j, i)\geq 0$), the control unit 101 performs processing for increasing a difference between the viewpoint images to sharpen the parallax (crosstalk correction processing, first sharpening processing) on the first and second viewpoint images $I_1$ and $I_2$ (plurality of viewpoint images). In areas where the image displacement difference amount distribution $M_{DIFF}(j, i)$ is below 0 ($M_{DIFF}(j, i)<0$), the control unit 101 performs processing for reducing a difference between viewpoint images to smooth a parallax (crosstalk processing, first smoothing processing). By such processing, the control unit 101 generates the first modified viewpoint image and the second modified viewpoint image (plurality of modified viewpoint images).

In step S5 of FIG. 2, the control unit 101 initially sets a first intensity parameter $k_{ct}\geq 0$ for specifying intensity of the processing for increasing a difference between the viewpoint images to sharpen the parallax (crosstalk correction processing, first sharpening processing) on the first and second viewpoint images (plurality of viewpoint images). Alternatively, the control unit 101 sets a first intensity parameter $k_{ct}\geq 0$ for specifying intensity of the processing for reducing a difference between the viewpoint images to smooth the parallax (crosstalk processing, first smoothing processing).

In step S5, the control unit 101 then sets a first intensity parameter distribution $K_{ct}(j, i)$ by Eq. (3):

The first intensity parameter distribution $K_{ct}(j, i)$ is proportional to the image displacement difference amount distribution $M_{DIFF}(j, i)$ with $k_{ct}$ as a proportionality factor.

$$K_{ct}(j,i)=k_{ct}\times M_{DIFF}(j,i). \quad (3)$$

In step S5, the control unit 101 then performs processing of Eqs. (4A) and (4B) on the first and second viewpoint images $I_1(j, i)$ and $I_2(j, i)$ (first to $N_{LF}$-th viewpoint images). The control unit 101 thereby generates a first modified viewpoint image $MI_1(j, i)$ and a second modified viewpoint image $MI_2(j, i)$ (first to $N_{LF}$-th modified viewpoint images).

$$\begin{pmatrix} MI_1(j, i) \\ MI_2(j, i) \end{pmatrix} = \begin{pmatrix} 1+K_{ct}(j, i) & -K_{ct}(j, i) \\ -K_{ct}(j, i) & 1+K_{ct}(j, i) \end{pmatrix} \begin{pmatrix} I_1(j, i) \\ I_2(j, i) \end{pmatrix}, \quad (4A)$$

$(K_{ct}(j, i) \geq 0),$ $$\begin{pmatrix} MI_1(j, i) \\ MI_2(j, i) \end{pmatrix} = \begin{pmatrix} \frac{1-K_{ct}(j, i)}{1-2K_{ct}(j, i)} & \frac{-K_{ct}(j, i)}{1-2K_{ct}(j, i)} \\ \frac{-K_{ct}(j, i)}{1-2K_{ct}(j, i)} & \frac{1-K_{ct}(j, i)}{1-2K_{ct}(j, i)} \end{pmatrix} \begin{pmatrix} I_1(j, i) \\ I_2(j, i) \end{pmatrix}, \quad (4B)$$

$(K_{ct}(j, i) < 0),$

Eq. (4A) represents processing for increasing a difference between the first and second viewpoint images $I_1(j, i)$ and $I_2(j, i)$ (plurality of viewpoint images) to sharpen the parallax in areas where the first intensity parameter distribution $K_{ct}(j, i)$ (image displacement difference amount distribution) is 0 or above ($K_{ct}(j, i)$ $k_{ct}\times M_{DIFF}(j, i)\geq 0$). Eq. (4B) represents processing for reducing a difference between the first and second viewpoint images $I_1(j, i)$ and $I_2(j, i)$ (plurality of viewpoint images) to smooth the parallax in areas where the first intensity parameter distribution $K_{ct}(j, i)$ (image displacement difference amount distribution) is below 0 ($K_{ct}(j, i)=k_{ct}\times M_{DIFF}(j, i)<0$).

FIG. 3 is a graph illustrating an example of the processing for increasing a difference between the first and second viewpoint images $I_1(j, i)$ and $I_2(j, i)$ (plurality of viewpoint images) to sharpen the parallax (crosstalk correction processing, first sharpening processing). The horizontal axis indicates a pixel position. The vertical axis indicates a pixel value (signal level). In FIG. 3, examples of the first viewpoint image $I_1(j, i)$ (before modification A) and the second viewpoint image $I_2(j, i)$ (before modification B) before the sharpening processing (crosstalk correction processing, first sharpening processing) are illustrated by broken lines. Examples of the first modified viewpoint image $MI_1(j, i)$ (after modification A) and the second modified viewpoint image $MI_2(j, i)$ (after modification B) after the sharpening processing (crosstalk correction processing, first sharpening processing) of Eq. (4A) are illustrated by solid lines. The processing for increasing a difference between the viewpoint images to sharpen the parallax (crosstalk correction processing, first sharpening processing) enhances portions where there is a large difference between the viewpoint images before the processing. Portions where there is a small difference between the viewpoint images are not much changed. Thus, it can be seen that the parallax between the viewpoint images is sharpened.

The smoothing processing (crosstalk processing, first smoothing processing) of Eq. (4B) reduces differences between the first and second viewpoint images $I_1(j, i)$ and $I_2(j, i)$ (plurality of viewpoint images) to smooth the parallax between the viewpoint images.

As described above, in the present exemplary embodiment, the image processing for sharpening and smoothing according to the contrast distribution $M_{CON}(j, i)$ and the image displacement amount distribution $M_{DIS}(j, i)$ is performed on the plurality of viewpoint images. The image processing according to the contrast distribution $M_{CON}(j, i)$ and the image displacement amount distribution $M_{DIS}(j, i)$ may be any of sharpening processing, smoothing processing, and a combination of such processing according to need.

In the present exemplary embodiment, Eqs. (7A), (7B), (2), (3), (4A), and (4B), perform the image processing for sharpening and smoothing on the viewpoint images more intensely in areas where there is a smaller difference in contrast between the viewpoint images than in areas where there is a larger difference in contrast between the viewpoint images. The image processing for sharpening and smoothing on the viewpoint images is also performed more intensely in areas where the contrast distribution $M_{CON}(j, i)$ is higher than in areas where the contrast distribution $M_{CON}(j, i)$ is lower.

In the present exemplary embodiment, Eqs. (2), (3), (4A), and (4B) perform the sharpening processing in areas where the image displacement amount distribution $M_{DIS}(j, i)$ shows a smaller difference from a predetermined shift amount (reference). The smoothing processing is performed in areas where the image displacement amount distribution $M_{DIS}(j, i)$ has a larger difference. In the present exemplary embodiment, Eqs. (2), (3), and (4A), perform the sharpening processing more intensely in areas where the image displacement amount distribution $M_{DIS}(j, i)$ has a smaller difference from, the predetermined shift amount than in areas where the image displacement amount distribution $M_{DIS}(j, i)$ has a larger difference.

In the present exemplary embodiment, Eqs. (2), (3), and (4B), perform, the smoothing processing more intensely in areas where the image displacement amount distribution $M_{DIS}(j, i)$ has a larger difference from, the predetermined shift amount than, in areas where the image displacement amount distribution has a smaller difference.

Further, in the present exemplary embodiment, Eqs. (4A) and (4B), perform the processing for increasing a difference between the plurality of viewpoint images to sharpen the parallax or reducing a difference between the plurality of viewpoint images to smooth the parallax for each pixel of the viewpoint images, whereby the plurality of modified viewpoint images is generated. The first sharpening processing of Eq. (4A) and the first smoothing processing of Eq. (4B) are arithmetic processing between the first viewpoint image $I_1(j, i)$ and the second viewpoint image $I_2(j, i)$ which are the output signals of the first and second photoelectric conversion units included in each pixel $(j, i)$.

[Refocusing by Shift Composition Processing]

In step S6 of FIG. 2, the control unit 101 performs processing for multiplying the first and second modified viewpoint images $MI_1(j, i)$ and $MI_2(j, i)$ (first to $N_{LF}$-th modified viewpoint images) by respective weighting factors, relatively shifting the products in the pupil division direction (x-axis direction), and adding the results (shift composition processing). The control unit 101 thereby generates an intermediate image which is a composite image of the plurality of viewpoint images.

FIG. 4 is an explanatory diagram illustrating an outline of refocusing by the shift composition processing of the first modified viewpoint image $MI_1(j, i)$ and the second modified viewpoint image $MI_2(j, i)$ (plurality of modified viewpoint images) in the pupil division direction (x-axis direction). In FIG. 4, the x-axis is taken in a vertical direction of the diagram while downward is defined as the positive direction of the x-axis as. A y-axis is taken in a direction perpendicular to the diagram while a near side from a drawing surface is defined as the positive direction of the y-axis. A z-axis is taken in a horizontal direction of the diagram while leftward is defined as the positive direction of the z-axis. FIG. 4 schematically illustrates the first modified viewpoint image $MI_1(j, i)$ and the second modified viewpoint image $MI_2(j, i)$.

The first and second modified viewpoint images $MI_1(j, i)$ and $MI_2(j, i)$ (plurality of modified viewpoint images) contain not only light intensity distribution information but incident angle information as well. A refocused image on a virtual imaging plane 610 can thus be generated by the following parallel translation and addition processing. First, the first modified viewpoint image $MI_1(j, i)$ is parallel translated up to the virtual imaging plane 610 along a principal ray angle $\theta_1$. The second modified viewpoint image $MI_2(j, i)$ is parallel translated up to the virtual imaging plane 610 along a principal ray angle $\theta_2$. Secondly, the translated first and second modified viewpoint images $MI_1(j, i)$ and $MI_2(j, i)$ are added.

Parallel translating of the first modified viewpoint image $MI_1(j, i)$ up to the virtual imaging plane 610 along the principal ray angle $\theta_1$ corresponds to a shift of −1 pixel in the column direction. Parallel translating of the second modified viewpoint image $MI_2(j, i)$ up to the virtual imaging plane 610 along the principal ray angle $\theta_2$ corresponds to a shift of +1 pixel in the column direction. In such a manner, the first and second modified viewpoint images $MI_1(j, i)$ and $MI_2(j, i)$ can be relatively shifted by +2 pixels, and the first modified viewpoint image $MI_1(j, i)$ and the second modified viewpoint image $MI_2(j, i+2)$ can be associated and added to generate a refocused signal on the virtual imaging plane 610.

In step S6 of FIG. 2, the control unit 101 generates a shift composite image $I_S(j, i)$, which is the refocused image on the virtual imaging plane 610, from the first and second modified viewpoint images $MI_1(j, i)$ and $MI_2(j, i)$ (plurality of modified viewpoint images) using Eq. (5):

In Eq. (5), pe is an even number closest to the predetermined image displacement amount p. The even number pe closest to the predetermined image displacement amount p is calculated by pe=2×ROUND (p/2), where ROUND is a rounding-off function.

$$I_S(j,i)=MI_1(j,i)+MI_2(j,i-pe). \quad (5)$$

The shift composition processing of the first and second modified viewpoint images $MI_1(j, i)$ and $MI_2(j, i)$ is not limited to the even number shifting and addition processing. Real number shifting and more generic composition processing may be used if needed. The processing of step S7 of FIG. 2 to be described below may be omitted according to need, and the shift composite image $I_S(j, i)$ generated by shifting and adding the first and second modified viewpoint images $MI_1(j, i)$ and $MI_2(j, i)$ (plurality of modified viewpoint images) may be output as an output image.

[Sharp/Unsharp Control]

In step S7 of FIG. 2, the control unit 101 performs second sharpening and second smoothing processing according to the image displacement difference amount distribution $M_{DIFF}(j, i)$ on the shift composite image $I_S(j, i)$ (intermediate image) generated from the first and second modified viewpoint images $MI_1(j, i)$ and $MI_2(j, i)$ (first to $N_{LF}$-th modified viewpoint images). By such processing, the control unit 101 generates an output image that is subjected to sharp/unsharp control for adaptively controlling areas of high sharpness and areas of high degrees of blur after imaging.

In the present exemplary embodiment, the control unit 101 performs the second sharpening processing on the shift composite image $I_S(j, i)$ in areas where the image displacement difference amount distribution $M_{DIFF}(j, i)$ is 0 or above ($M_{DIFF}(j, i)≥0$). On the other hand, the control unit 101 performs the second smoothing processing in areas where the image displacement difference amount distribution $M_{DIFF}(j, i)$ is below 0 ($M_{DIFF}(j, i)<0$). The control unit 101 thereby generates the output image.

In step S7 of FIG. 2, the control unit 101 initially sets a second intensity parameter $K_{USM}≥0$ for specifying intensity of the second sharpening processing or second smoothing processing on the shift composite image $I_S(j, i)$.

In step S7, the control unit 101 then applies a two-dimensional low-pass filter $\{F_{LPF}(j_{LPF}, i_{LPF})|-n_{LPF}≤j_{LPF}≤n_{LPF}, -m_{LPF}≤i_{LPF}≤m_{LPF}\}$ to the shift composite image $I_S(j, i)$. The control unit 101 calculates an unsharp mask $I_{USM}(j, i)$ using Eq. (6):

For example, a two-dimensional filter such as $'[1, 0, 2, 0, 1]\times[1, 0, 2, 0, 1]$ may be used as the two-dimensional low-pass filter $F_{LPF}(j_{LPF}, i_{LPF})$. A two-dimensional Gaussian distribution may be used if needed.

$$I_{USM}(j, i) = I_S(j, i) - \sum_{j_{LPF}=-n_{LPF}}^{n_{LPF}} \sum_{i_{LPF}=-m_{LPF}}^{m_{LPF}} F_{LPF}(j_{LPF}, i_{LPF}) \times I_S(j+j_{LPF}, i+i_{LPF}). \quad (6)$$

In step S7, the control unit 101 finally applies the unsharp mask $I_{USM}(j, i)$ to the shift composite image $I_S(j, i)$ according to the image displacement difference amount distribution $M_{DIFF}(j, i)$ to perform the second sharpening or smoothing processing using Eq. (7). The control unit 101 thereby generates a refocused image $I_{RF}(j, i)$ which is the output image.

$$I_{RF}(j,i)=I_S(j,i)+k_{USM}\times M_{DIFF}(j,i)\times I_{USM}(j,i). \quad (7)$$

In areas where the image displacement difference amount distribution $M_{DIFF}(j, i)$ is 0 or above ($M_{DIFF}(j, i)≥0$), Eq. (7) represents the second sharpening processing. The second sharpening processing is processing for sharpening the shift composite image $I_S(j, i)$ according to the magnitude of the image displacement difference amount distribution $M_{DIFF}(j, i)$ using the unsharp mask $I_{USM}(j, i)$ multiplied by a positive coefficient $k_{USM}\times M_{DIFF}(j, i)$.

On the other hand, in areas where the image displacement difference amount distribution $M_{DIFF}(j, i)$ is below 0 ($M_{DIFF}(j, i)<0$), Eq. (7) represents the second smoothing processing. The second smoothing processing is processing for smoothing the shift composite image $I_S(j, i)$ according to the magnitude of the image displacement difference amount distribution $M_{DIFF}(j, i)$ using the unsharp mask $I_{USM}(j, i)$ multiplied by a negative coefficient $k_{USM}\times M_{DIFF}(j, i)$.

The refocusing by the shift composition processing can be performed based on an optical principle using light field (LF) data. The refocusing by the shift composition processing has an advantage that the processing can be applied even to areas where the image displacement difference amount distribution $M_{DIFF}(j, i)$ is not detectable. If the x-axis direction (y-axis direction) is the only pupil division direction, like the pupil division of the present exemplary embodiment (Nx=2, Ny=1, and $N_{LF}$=2), the following situation can occur. That is, a refocusing effect is obtained in the x-axis direction (y-axis direction) which is the pupil division direction, while a sufficient refocusing effect is not obtained in the y-axis direction (x-axis direction) orthogonal to the pupil division direction. On the other hand, a blur control by the sharpening and smoothing according to the image displacement difference amount distribution $M_{DIFF}(j, i)$ can provide a refocusing effect regardless of the pupil division direction. In the present exemplary embodiment, the processing for adjusting the resolution feeling is performed by combining the refocusing by the shift composition processing with the blur control by the sharpening and smoothing according to the image displacement difference amount distribution $M_{DIFF}(j, i)$. A refocusing effect can thus be obtained even in the direction orthogonal to the pupil division direction.

As described above, in the present exemplary embodiment, the output image is generated by performing the image processing for sharpening and smoothing according to the image displacement amount distribution $M_{DIS}(j, i)$ on the composite image $I_S(j, i)$ of the plurality of modified viewpoint images. More specifically, Eq. (5) adjusts the shift amount to adjust the position in the depth direction at which the resolution feeling is the most enhanced. The coefficients $k_{ct}$ and $K_{USM}$ in Eqs. (3) and (7) can also be modified according to user operations, whereby the intensity of the resolution feeling of the output image (display image) can be adjusted.

In the present exemplary embodiment, the adjustment width of the intensity of the resolution feeling is changed according to the International Organization for Standardization (ISO) sensitivity when the viewpoint images are captured. The reason is that the higher the ISO sensitivity, the lower a signal-to-noise (S/N) ratio, and a strong adjustment applied to the resolution feeling of the image can further reduce the image quality. FIG. 6A illustrates a table of examples of setting values. The table is stored in the ROM 103 in advance. However, the table may be modified by user settings. Since the shift amount between the viewpoint images is unaffected at this time, the adjustment width of the shift amount is constant regardless of the ISO sensitivity.

Next, processing for changing a point of view by controlling the composition ratio of the plurality of viewpoint images, which is the processing specific to the present exemplary embodiment, will be described. Such processing has an effect of displaying a main object more sharply by controlling the composition ratio to change the point of view and shift a blur. Basically, the plurality of viewpoint images is synthesized in a specified area at a specified composition ratio, and a resultant image is superimposed and displayed on the original composite image. A composite image J(j, i) at coordinates (j, i) is expressed by Eq. (8):

$$J(j,i)=(1-k_{view})I_1(j,i)+k_{view}I_2(j,i). \qquad (8)$$

$k_{view}$ can be adjusted to adjust the effect of a blur influenced from other objects.

In the present exemplary embodiment, the composition ratio of the viewpoint images is manually set. However, a setting manner is not limited thereto. The composition ratio may be automatically determined. For example, the composition ratio may be variously changed to generate a plurality of composite images and the change in the composite images may be detected to automatically set an optimum composition ratio that is effective for blur shift.

Next, the ghost reduction processing using a difference in the effect of ghosts obtained from the plurality of viewpoint images, which is processing specific to the present exemplary embodiment, will be described. In the present exemplary embodiment, the difference between the plurality of viewpoint images is determined area by area (or pixel by pixel), and only positive difference values are extracted to detect unwanted light components (ghost components). The detected unwanted light components are subtracted from the image to be displayed or recorded (in the present exemplary embodiment, the composite image of the plurality of viewpoint images) to carry out ghost reduction processing. If three or more viewpoint images are relevant, and there are several difference values (difference images) as a result of combination of the viewpoint images, a combination that maximizes (the maximum value or accumulated value of) the differences can be selected and processed to perform the ghost reduction processing to the maximum effect.

Some lenses may be characteristically less likely to produce a ghost. Therefore, in the present exemplary embodiment, control is performed to enable or disable the ghost reduction processing based on lens information when the viewpoint images are captured. Specifically, if a lens is less likely to produce a ghost, control is performed to disable modification of the setting of the ghost reduction processing. Whether a lens is less likely to produce a ghost, or whether the lens needs a ghost adjustment, is stored in a table illustrated in FIG. 6B to be described below.

FIG. 5A illustrates an example of a GUI to be applied to the image data, the resolution feeling adjustment processing, the blur shift processing by changing the point of view, and the ghost reduction processing, which are characteristic of the present exemplary embodiment. A window 500 represents a display of the entire application for applying the foregoing processing to the image data. A display image 501 is configured to display the image to be processed. When image processing is applied to the display image 501 by using various parameters set on the application, the display image 501 is updated to display the image data subjected to the processing.

A palette 502 is a GUI for setting parameters and application ranges of image processing including the image processing characteristic of the present exemplary embodiment. In the present exemplary embodiment, the resolution feeling adjustment processing and the blur shift processing can be simultaneously applied. The ghost reduction processing is to be exclusively applied without carrying out the other processing. However, exemplary embodiments are not limited thereto. Each type of processing may be configured to be executable only in an exclusive manner so that the accuracy of the processing can be ensured and maintained easily. All the processing may be configured to be simultaneously applicable to increase the degree of processing freedom. The palette 502 includes a user interface (UI) for selecting either a resolution feeling adjustment/blur shift or ghost reduction. FIG. 5A illustrates a case in which a resolution feeling adjustment/blur shift is selected.

A parameter setting screen for a resolution feeling adjustment displays the following: a checkbox for setting whether to perform a resolution feeling adjustment, a bar 503 and an index 503p for adjusting a position in the depth direction where the resolution feeling is maximized (adjusting the shift amount between the viewpoint images), and a bar 504 and an index 504p for adjusting the intensity of the resolution feeling adjustment.

The bar 503 is configured to indicate corresponding directions "far (0)" and "near (0)" at the top and bottom. The accompanying numerals indicate a degree of adjustment (shift) with reference to the center of the bar 503. In the present exemplary embodiment, five levels to the far side and five levels to the near side, or a total of 11 levels, can be set. The number of settable levels of adjustment and the actual shift amount of pixels allocated for one level can be arbitrarily set.

The palette 502 displays "intensity (5)" as the set level of intensity corresponding to the bar 504. In the present exemplary embodiment, 11 levels of intensity can be set in terms of integers of 0 to 10 with the left end as 0. As described above, $k_{ct}$ and $k_{USM}$ are set to correspond to the level of intensity. As the numeral increases, $K_{ct}$ is set to increase the separation performance of the two images and $k_{USM}$ is set to enhance an effect of edge and blur processing.

In a parameter setting screen for a blur shift, followings are displayed: a checkbox for setting whether to perform, a blur shift, and a button 505 to enter processing for selecting an area to apply the blur shift to. If an instruction (cursor designation or touch operation) to operate the button 505 is given, an operation for selecting the area to be applied within the image is enabled. In the setting screen, a checkbox 506 for setting whether to display a boundary of the selected area, and a bar 507 and an index 507p for setting a composition ratio are also displayed. The bar 507 is configured to indicate "left (0)" and "right (0)" on the left and right, to indicate a direction of the point of view in which the image generated by the setting of the composition ratio is seen. The accompanying numerals indicate how close the image is synthesized to one point of view with reference to the center of the bar 507 (where the viewpoint images are composited at a ratio of 1:1).

In a setting screen for the ghost reduction processing followings are displayed: a checkbox for setting whether to perform ghost reduction, a button 508 for entering processing for selecting an area to apply the ghost reduction to, and a checkbox 509 for setting whether to display a boundary of the selected area.

Operations on the foregoing palette 502 and the display image 501 may be made according to instructions from the input devices such as a keyboard and a mouse. Alternatively, the indexes and buttons may be operated by touching from a touch panel.

A processing flow for determining adjustment ranges and whether to adjust the parameters of the image processing characteristic of the present exemplary embodiment will be described with reference to the flowchart of FIG. 5B. Steps S5010 to S5040 are each executed by the control unit 101 or by various components according to instructions from, the control unit 101. If the user operates the operation, unit 105, the control unit 101 activates software based on a program, reads an image file including viewpoint images (viewpoint image file) from the external storage device 104, and loads the viewpoint image file into the RAM 103, whereby the processing illustrated in FIG. 5B is started.

In step S5010, the control unit 101 obtains imaging information recorded as metadata from the read out viewpoint image file. In the present exemplary embodiment, the control unit 101 refers to the ISO sensitivity set at the time of imaging as the imaging information.

In step S5020, the control unit 101 obtains identification (ID) information corresponding to the model of the imaging apparatus, recorded as metadata from the read out viewpoint image file.

In step S5030, the control unit 101 refers to a table such as that illustrated in FIG. 6A recorded in the ROM 108, and sets an adjustable range of intensity of the resolution feeling adjustment corresponding to the ISO sensitivity. Suppose, for example, that the plurality of viewpoint images (and the composite image) is captured at an ISO sensitivity of 1600. According to FIG. 6A, since 800≤(the ISO sensitivity of the images)≤3200, the corresponding coefficients $K_{ct}$ and $k_{USM}$ are multiplied by a correction coefficient of 0.8, accordingly to a limited effect. In the present exemplary embodiment, the number of possible levels of adjustment indicated by the bar 504 is kept unchanged at 11 levels while the corresponding inside parameters are multiplied by the correction coefficient. However, the exemplary embodiment is not limited thereto. The number of possible levels of adjustment of the bar 504 may be reduced to indicate the absolute intensity of the effect.

In step S5040, the control unit 101 refers to a table such as that illustrated in FIG. 6B recorded in the ROM 108, and sets the applicability of the ghost reduction processing according to the lens type obtained from the metadata. According to the table of FIG. 6B, if the lens is the lens A, the optical system is less likely to produce a ghost or there occurs only a ghost that cannot be removed under the currently-obtained parallax of the viewpoint images. In such a case, a setting is made such that the ghost reduction processing described in the present exemplary embodiment is not applicable. For example, the setting portion of the ghost reduction processing on the palette 502 is grayed out. Alternatively, the application of the ghost reduction processing may be cancelled inside the apparatus even if the user checks on the checkbox to apply the ghost reduction processing.

In the present exemplary embodiment, the refocusing intensity slider (the maximum value of the intensity of parallax enhancement) is configured to vary only with the ISO sensitivity. However, the refocusing intensity slider may be configured to vary with imaging conditions (imaging information) such as the aperture value (F value) and a focal length of the lens. According to the exemplary embodiment, the width of the intensity of the resolution feeling adjustment is variable with the ISO sensitivity, and the adjustment width of the shift amount of the refocus processing is fixed. However, the adjustment widths may be either fixed or variable, for example, depending on the characteristics of the image sensor and other imaging conditions (aperture value and focal length). The ghost reduction may be implemented such that an adjustment value can be set even if the lens is less likely to produce a ghost, which is difficult for eyes to notice.

Further, a plurality of viewpoint images obtained by an image sensor in which a plurality of pixels is assigned to each single microlens like the present exemplary embodiment is particularly susceptible to shading due to vignetting. Shading correction is in advance performed on each of the plurality of viewpoint images. When a correction function for detecting shading occurring in each viewpoint image is detected from, the pixel values of the viewpoint image, a correct shading function may not be detected due to pixels of which signals are saturated by incident light or pixels to which charges leak in from around. In such a case, since the shading correction, cannot be properly performed, the shading correction is set disabled. Viewpoint images lacking proper shading correction may not be subjected to appropriate blur shift processing or ghost reduction processing. Therefore, information about whether the shading correction has been successful or information indicating whether the shading correction is enabled or disabled (in which case the shading correction is yet to be applied to the image) is recorded in the metadata of the image file as imaging information. On the setting screen for making settings of the blur shift processing or the ghost reduction processing, the control unit 101 imposes a limitation not to apply the processing based on the information that the shading processing has not been successful or that the shading processing is disabled. To impose such a limitation, a setting may be made such that the checkboxes for the blur shift processing and the ghost reduction processing may be grayed out and disabled. Alternatively, the processing may be made inapplicable (disabled) regardless of the positions of the indexes even if the user checks on the checkboxes and moves the indexes.

The exemplary embodiments of the present exemplary embodiment have been described in detail above. However, the present disclosure is not limited to such exemplary embodiments, and various modes not departing from the gist of the disclosure are also covered by the present disclosure. Parts of the foregoing exemplary embodiments may be appropriately combined. An exemplary embodiment of the present disclosure may include supplying a software program for implementing the functions of the foregoing exemplary embodiments to a system or an apparatus including a computer that can execute the program, directly via a recording medium or by using wired/wireless communications. Therefore, a program code itself that is supplied to and installed on the computer to implement the functional processing of the present disclosure also constitutes an exemplary embodiment of the present disclosure. In other words, a computer program itself for implementing the functional processing of the present disclosure is also covered by the present disclosure. In such a case, the program may be in any mode as long as the program has such functions. Examples of the mode of the program include object code, a program to be executed by an interpreter, and script data supplied to an operating system (OS). Examples of the recording medium for supplying the program may include a magnetic recording medium such as a hard disk and a magnetic tape, an optical/magnetooptical recording media, and a nonvolatile semiconductor memory. Examples of the method for supplying the program may include storing a computer program constituting an exemplary embodiment of the present disclosure in a server present on a computer network, and downloading and installing the computer program by a connected client computer.

An image processing apparatus for performing image processing using a plurality of viewpoint images and a method for controlling the same provide a desired image effect by a user's simple operations.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium, may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-112159, filed Jun. 3, 2016 which is hereby incorporated by reference herein in its entirety.

What is claimed is:

1. An image processing apparatus comprising:
an acquisition unit configured to obtain a plurality of viewpoint images and imaging information corresponding to the plurality of viewpoint images;
an image processing unit configured to apply image processing to image data based on the viewpoint images;
a setting unit configured to set a parameter of the image processing by the image processing unit based on a user operation; and
a limitation unit configured to limit the parameter settable by a user via the setting unit in the image processing based on the imaging information,
wherein a parameter of blur shift processing for shifting a position of a blur in an image is a composition ratio in synthesizing the viewpoint images, the blur shift processing being applied by the image processing unit, the parameter being set by the setting unit.

2. The image processing apparatus according to claim 1, wherein the imaging information includes ISO sensitivity, a focal length, a lens, and an aperture value when the viewpoint images are captured.

3. The image processing apparatus according to claim 1, wherein a parameter of adjustment processing for adjusting a resolution feeling of an image is intensity of processing, the adjustment processing being applied by the image processing unit, the parameter being set by the setting unit.

4. The image processing apparatus according to claim 1, wherein the viewpoint images are images obtained from an image sensor in which a plurality of photoelectric conversion elements is assigned to a microlens.

5. The image processing apparatus according to claim 1, wherein the viewpoint images are images obtained from a multi-lens imaging apparatus.

6. The image processing apparatus according to claim 1, wherein an adjustment width of intensity of the processing for adjusting a resolution feeling of an image is variable by the limitation unit based on the imaging information, the adjustment processing being applied by the image processing unit, the intensity being set by the setting unit.

7. The image processing apparatus according to claim 1, wherein an adjustment width of intensity of the processing for adjusting a resolution feeling of an image is fixed regardless of the imaging information, the adjustment processing being applied by the image processing unit, the intensity being set by the setting unit.

8. The image processing apparatus according to claim 1, wherein processing for reducing a ghost within an image is switched between an enabled and disabled state based on the imaging information, the ghost reduction processing being applied by the image processing unit.

9. The image processing apparatus according to claim 8, the imaging information based on which the ghost reduction processing is switched between the enabled and disabled state is lens information when the viewpoint images are captured.

10. The image processing apparatus according to claim 1, the processing for reducing a ghost in an image is constantly in an enabled state regardless of the imaging information, the ghost reduction processing being applied by the image processing unit.

11. The image processing apparatus comprising:
an acquisition unit configured to obtain a plurality of viewpoint images and imaging information corresponding to the plurality of viewpoint images;
an image processing unit configured to apply image processing to image data based on the viewpoint images;
a setting unit configured to set a parameter of the image processing by the image processing unit based on a user operation; and
a limitation unit configured to limit the parameter settable by a user via the setting unit in the image processing based on the imaging information,
wherein an adjustment width of a shift amount of the viewpoint images in blur shift processing for shifting a position of a blur in an image is variable by the limitation unit based on the imaging information, the blur shift processing being applied by the image processing unit, the shift amount being set by the setting unit.

12. The image processing apparatus comprising:
an acquisition unit configured to obtain a plurality of viewpoint images and imaging information corresponding to the plurality of viewpoint images;

an image processing unit configured to apply image processing to image data based on the viewpoint images;

a setting unit configured to set a parameter of the image processing by the image processing unit based on a user operation; and a limitation unit configured to limit the parameter settable by a user via the setting unit in the image processing based on the imaging information, wherein an adjustment width of a shift amount of the viewpoint images in blur shift processing for shifting a position of a blur in an image is fixed regardless of the imaging information, the blur shift processing being applied by the image processing unit.

13. A method for controlling an image processing apparatus, comprising:

obtaining a plurality of viewpoint images and imaging information corresponding to the plurality of viewpoint images;

imposing a limitation on a user-settable parameter in image processing by an image processing unit based on the imaging information;

setting a parameter of the image processing by the image processing unit based on a user operation and the limitation; and applying the image processing by the image processing unit to image data based on the viewpoint images, wherein a parameter of blur shift processing for shifting a position of a blur in an image is a composition ratio in synthesizing the viewpoint images, the blur shift processing being applied by the image processing unit, the parameter being set.

14. A method for controlling an image processing apparatus, comprising:

obtaining a plurality of viewpoint images and imaging information corresponding to the plurality of viewpoint images;

imposing a limitation on a user-settable parameter in image processing by an image processing unit based on the imaging information;

setting a parameter of the image processing by the image processing unit based on a user operation and the limitation; and applying the image processing by the image processing unit to image data based on the viewpoint images, wherein an adjustment width of a shift amount of the viewpoint images in blur shift processing for shifting a position of a blur in an image is variable by the limitation unit based on the imaging information, the blur shift processing being applied by the image processing unit, the shift amount being set.

15. A method for controlling an image processing apparatus, comprising:

obtaining a plurality of viewpoint images and imaging information corresponding to the plurality of viewpoint images;

imposing a limitation on a user-settable parameter in image processing by an image processing unit based on the imaging information;

setting a parameter of the image processing by the image processing unit based on a user operation and the limitation; and applying the image processing by the image processing unit to image data based on the viewpoint images, wherein an adjustment width of a shift amount of the viewpoint images in blur shift processing for shifting a position of a blur in an image is fixed regardless of the imaging information, the blur shift processing being applied by the image processing unit.

* * * * *